United States Patent
Harviainen

(10) Patent No.: US 11,816,786 B2
(45) Date of Patent: *Nov. 14, 2023

(54) SYSTEM AND METHOD FOR DYNAMICALLY ADJUSTING LEVEL OF DETAILS OF POINT CLOUDS

(71) Applicant: InterDigital Madison Patent Holdings, SAS, Paris (FR)

(72) Inventor: Tatu V J Harviainen, Helsinki (FI)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/721,001

(22) Filed: Apr. 14, 2022

(65) Prior Publication Data

US 2022/0237856 A1 Jul. 28, 2022

Related U.S. Application Data

(63) Continuation of application No. 16/982,373, filed as application No. PCT/US2019/021846 on Mar. 12, 2019, now Pat. No. 11,328,474.

(Continued)

(51) Int. Cl.
*G06T 15/20* (2011.01)
*H04N 13/117* (2018.01)
(Continued)

(52) U.S. Cl.
CPC .......... *G06T 15/20* (2013.01); *G02B 27/0172* (2013.01); *G06N 3/08* (2013.01);
(Continued)

(58) Field of Classification Search
None
See application file for complete search history.

(56) References Cited

U.S. PATENT DOCUMENTS

| 6,201,546 B1 | 3/2001 | Border |
| 8,471,849 B1 | 6/2013 | Hickman |

(Continued)

FOREIGN PATENT DOCUMENTS

| CN | 107194983 | 9/2017 |
| CN | 107862293 | 3/2018 |

(Continued)

OTHER PUBLICATIONS

Kuma, Satoru, et. al., "PCC CE1.3 Recolor Method". Sony Corporation, International Organization for Standardization, Coding of Moving Pictures and Audio, ISO/IEC JTC1/SC29/WG11 MPEG2017/M42141, Jan. 2018, 9 pages.

(Continued)

*Primary Examiner* — Ryan M Gray
(74) *Attorney, Agent, or Firm* — Smadar Gefen

(57) ABSTRACT

Some embodiments of an example method disclosed herein may include receiving point cloud data representing one or more three-dimensional objects; receiving a viewpoint of the point cloud data; selecting a selected object from the one or more three-dimensional objects using the viewpoint; retrieving a neural network model for the selected object; generating a level of detail data for the selected object using the neural network model; and replacing, within the point cloud data, points corresponding to the selected object with the level of detail data.

16 Claims, 10 Drawing Sheets

Related U.S. Application Data

(60) Provisional application No. 62/645,618, filed on Mar. 20, 2018.

(51) Int. Cl.
  *G02B 27/01* (2006.01)
  *G06N 3/08* (2023.01)
  *G06T 19/00* (2011.01)

(52) U.S. Cl.
  CPC ......... *G06T 19/006* (2013.01); *H04N 13/117* (2018.05); *G02B 2027/0187* (2013.01); *G06T 2210/36* (2013.01)

(56) References Cited

U.S. PATENT DOCUMENTS

| | | | |
|---|---|---|---|
| 8,525,848 B2 | 9/2013 | Janson | |
| 8,768,659 B2 | 7/2014 | Vasudevan | |
| 8,848,201 B1 | 9/2014 | Bruce | |
| 9,412,361 B1* | 8/2016 | Geramifard | G06V 10/811 |
| 10,699,421 B1 | 6/2020 | Cherevatsky | |
| 11,328,474 B2* | 5/2022 | Harviainen | H04N 13/117 |
| 2007/0047840 A1 | 3/2007 | Xu | |
| 2009/0128554 A1 | 5/2009 | Elsberg | |
| 2011/0115812 A1 | 5/2011 | Minear | |
| 2012/0194517 A1 | 8/2012 | Izadi | |
| 2014/0198097 A1 | 7/2014 | Evans | |
| 2015/0006117 A1* | 1/2015 | Zhang | G06V 20/64 703/2 |
| 2015/0035820 A1 | 2/2015 | Le | |
| 2015/0254499 A1 | 9/2015 | Pang | |
| 2016/0044240 A1 | 2/2016 | Beers | |
| 2016/0071318 A1 | 3/2016 | Ken | |
| 2016/0133044 A1 | 5/2016 | Lynch | |
| 2016/0333691 A1 | 11/2016 | Puura | |
| 2016/0371539 A1 | 12/2016 | Ming | |
| 2017/0083792 A1* | 3/2017 | Rodríguez-Serrano | G06V 20/63 |
| 2017/0213394 A1 | 7/2017 | Ratcliff | |
| 2017/0214943 A1* | 7/2017 | Cohen | H04N 19/62 |
| 2017/0243352 A1 | 8/2017 | Kutliroff | |
| 2017/0264833 A1 | 9/2017 | Barnes | |
| 2017/0287216 A1 | 10/2017 | Kim | |
| 2017/0323472 A1 | 11/2017 | Barnes | |
| 2017/0347122 A1 | 11/2017 | Chou | |
| 2018/0170388 A1 | 6/2018 | Shin | |
| 2019/0058859 A1* | 2/2019 | Price | H04N 13/271 |
| 2019/0087978 A1 | 3/2019 | Tourapis | |
| 2019/0096035 A1 | 3/2019 | Zhengmin | |
| 2019/0227145 A1 | 7/2019 | Pishehvari | |
| 2019/0289281 A1 | 9/2019 | Badrinarayanan | |
| 2019/0295266 A1 | 9/2019 | Fan | |
| 2020/0184602 A1* | 6/2020 | Li | G06F 3/011 |
| 2020/0311881 A1 | 10/2020 | Robert | |
| 2023/0074296 A1* | 3/2023 | Wang | G06V 40/14 |
| 2023/0080852 A1* | 3/2023 | Meardi | G06T 9/001 |

FOREIGN PATENT DOCUMENTS

| | | |
|---|---|---|
| DE | 102017011562 | 5/2018 |
| EP | 3296962 | 3/2018 |
| JP | 2015522987 A | 8/2015 |

OTHER PUBLICATIONS

Nakagami, Ohji, et. al., "Point cloud compression technology proposal by Sony". International Organization for Standardization, Coding of Moving Pictures and Audio, ISO/IEC JTC1/SC29/WG11 MPEG2017/ M41665, Oct. 2017, 43 pages.

Qil, Charles R., et. al., "Pointnet++: Deep Hierarchical Feature Learning on Point Sets in a Metric Space". arXiv preprint arXiv:1706.02413, (2017), pp. 1-14.

Klokov, Roman, et. al., "Escape From Cells: Deep Kd-Networks for the Recognition of 3d Point Cloud Models". Proceedings of the IEEE International Conference on Computer Vision, (2017), pp. 863-872.

Ben-Shabat, Yizhak, et. al., "3D Point Cloud Classification and Segmentation Using 3d Modified Fisher Vector Representation for Convolutional Neural Networks". arXiv preprint arXiv:1711.0824, Nov. 22, 2017, pp. 1-13.

Santana Núñez, José Miguel, et. al., "Visualization of Large Point Cloud in Unity". Eurographics Technical Report Series, (2019), pp. 23-24.

Nakagami, Ohji, et al., "Point cloud compression technology proposal by Sony". International Organization for Standardization, Coding of Moving Pictures and Audio, ISO/IEC JTC1/SC29/WG11 MPEG2017, M41665 Power Point Presentation, Oct. 2017, 43 pages.

Collet, Alvaro, et. al. "High-Quality Streamable Free-Viewpoint Video". ACM Transactions on Graphics (TOG), vol. 34, No. 4, (2015), 13 pages.

Thanou, Dorina, et. al. "Graph-Based Motion Estimation and Compensation for Dynamic 3D Point Cloud Compression". IEEE International Conference on Image Processing (ICIP), (2015), 5 pages.

Bouaziz, Sofien, et. al., "Sparse Iterative Closest Point". Eurographics Symposium on Geometry Processing, vol. 32, No. 5, (2013), 11 pages.

De Queiroz, Ricardo L., et. al. "Compression of 3D Point Clouds Using a Region-Adaptive Hierarchical Transform". IEEE Transactions on Image Processing, Aug. 2016, vol. 25, No. 8, pp. 3947-3956.

Huang, Jing, et. al., "Point Cloud Matching Based on 3D Self-Similarity". IEEE Computer Society Conference on Computer Vision and Pattern Recognition Workshops (CVPRW), (2012), pp. 1-8.

Sultani, Zainab Namh, et. al., "Kinect 3D Point Cloud Live Video Streaming". International Conference on Communication, Management and Information Technology (ICCMIT), Procedia Computer Science, vol. 65, (2015), pp. 125-132.

Wang, Zunran, et. al., "Preprocessing and Transmission for 3D Point Cloud Data". International Conference on Intelligent Robotics and Applications, (2017), pp. 438-449.

Huang, Jing, et. al., "Point Cloud Labeling Using 3D Convolutional Neural Network". IEEE 23rd International Conference on Pattern Recognition (ICPR), (2016), pp. 2670-2675.

Saransaari, Hannu, "Visualization of Large Point Clouds". Umbra 3D Blog Article dated Apr. 7, 2016, available at: https://web.archive.org/web/20170928180350/http://umbra3d.com/visualization-of-large-point-clouds, 4 pages.

Qi, Charles R., et. al., "PointNet: Deep Learning on Point Sets for 3D Classification and Segmentation". Supplementary Material, arXiv:1612.00593v2, Apr. 10, 2017, 19 pages.

Liang, Shu, et. al., "3D Face Hallucination From a Single Depth Frame". IEEE 2nd International Conference on 3D Vision (3DV), Dec. 2014, 22 pages.

Gomes, Rafael Beserra, et. al., "Efficient 3D Object Recognition Using Foveated Point Clouds". Computers and Graphics, vol. 37, (2013), pp. 496-508.

"Point Cloud Library". Pointclouds.com, Web Archive dated Dec. 10, 2018, available at: https://web.archive.org/web/20181206231901/http://www.pointclouds.org/documentation/tutorials/cluster_extraction.php#cluster-extraction, 6 pages.

Wikipedia, "Transformation Matrix". Wikipedia web article, available at: https://en.wikipedia.org/w/index.php?title=Transformation_matrix&oldid=788651536, version dated Jul. 2, 2017, 9 pages.

Orts-Escolano, Sergio, et al., "Holoportation: Virtual 3D Teleportation In Real-Time". ACM Proceedings of the 29th Annual Symposium on User Interface Software and Technology, (2016), pp. 741-754.

Wang, Zongji, et al., "VoxSegNet: Volumetric CNNs for Semantic Part Segmentation of 3D Shapes". Journal of Latex Class Files, vol. 14, No. 8, Aug. 2015, pp. 1-11.

International Search Report and Written Opinion of the International Searching Authority for PCT/US2019/021846 dated Jun. 6, 2019, 11 pages.

(56) References Cited

OTHER PUBLICATIONS

Meng, Fang, et al. "Streaming Transmission of Point-Sampled Geometry Based on View-Dependent Level-of-Detail". Fourth International Conference on 3-D Digital Imaging and Modeling, Oct. 6-10, 2003, 8 pages.
Lequan, Yu, et. al., "PU-Net: Point Cloud Upsampling Network". Proceedings of the IEEE Conference on Computer Vision and Pattern Recognition, (2018), pp. 2790-2799.
Seo, Jinseok, et. al., "Levels of Detail (LOD) Engineering of VR Objects". Proceedings of The ACM Symposium on Virtual Reality Software and Technology, Dec. 20-22, 1999, pp. 104-110.
International Search Report and Written Opinion of the International Searching Authority for PCT/US2019/022994 dated Jun. 27, 2019, 13 pages.
Ramanathan, Subramanian, et al., "Impact of Vertex Clustering on Registration-Based 3D Dynamic Mesh Coding" Image and Vision Computing, vol. 26, No. 7, Jul. 2, 2008, pp. 1012-1026.
Gupta, Sumit, et al., "Compression of Dynamic 3D Geometry Data Using Iterative Closet Point Algorithm". Computer Vision and Image Understanding, vol. 87, No. 1-3, Jul. 1, 2002, pp. 116-130.
De Floriani, L., et al., "Dynamic View-Dependent Multiresolution on a Client-Server Architecture". Computer Aided Design, vol. 32, No. 13, Nov. 1, 2000, pp. 805-823.
Hajizadeh, Mohammadali, et al., "Eigenspace Compression: Dynamic 3D Mesh Compression by Restoring Fine Geometry to Deformed Coarse Models". Multimedia Tools and Applications, vol. 77, No. 15, Nov. 14, 2017, pp. 19347-19375.
Xu, Cao, et al., "Point Cloud Colorization Based on Densely Annotated 3D Shape Dataset". Arix.org, Oct. 12, 2018.
Xiao, Yi, et al., "Interactive Deep Colorization with Simultaneous Global and Local Inputs". Arix.org, Jan. 27, 2018.
Mammou, Khaled, et al., "PCC Test Model Category 13 v3". International Organization for Standardization, MPEG Meeting; Motion Picture Expert Group or ISO/IEC JTC1/SC29/WG11, No. n17762, Jul. 2018, 18 pages.
International Search Report and Written Opinion of the International Searching Authority for PCT/US2019/065771 dated Mar. 27, 2020, 12 pages.
International Preliminary Report on Patentability PCT/US2019/021846 dated Sep. 22, 2020, 8 pages.
International Preliminary Report on Patentability PCT/US2019/022994 dated Sep. 22, 2020, 10 pages.
Zhang, Richard, et al., "Real-Time User-Guided Image Colorization With Learned Deep Priors". ACM Transactions on Graphics, vol. 36, No. 4, Article 119, Jul. 2017, pp. 1-11.
Zhang, Richard, et al., "Colorful Image Colorization". European Conference on Computer Vision, (2016), pp. 1-29.
Qi, Charles R., et al., "PointNet: Deep Learning on Point Sets For 3D Classification and Segmentation". Presentation, Stanford University, (2017), 68 pages.
Lunscher, Nolan, et. al., "Point Cloud Completion of Foot Shape From a Single Depth Map for Fit Matching Using Deep Learning View Synthesis". Proceedings of the IEEE International Conference on Computer Vision Workshops, (2017), pp. 2300-2305.
Han, Xiaoguang, et. al. "High-Resolution Shape Completion Using Deep Neural Networks for Global Structure and Local Geometry Inference". Proceedings of the IEEE International Conference on Computer Vision, (2017), pp. 85-93.
Mekuria, Rufael, et. al., "Overview of the MPEG Activity on Point Cloud Compression". IEEE Data Compression Conference (DCC), (2016), pp. 620-620.
Liu, Zhenyu, et al., "CU Partition Mode Decision for HEVC Hardwired Intra Encoder Using Convolution Neural Network". IEEE Transactions on Image Processing, vol. 25, No. 11, Nov. 2016, pp. 5088-5103.
Xu, Mai, et al., "Reducing Complexity of Hevc: A Deep Learning Approach". IEEE Transactions on Image Processing, vol. 27, No. 10, (2018), pp. 1-17.
Zhu, Kongfeng, et al., "No-Reference Video Quality Assessment Based on Artifact Measurement and Statistical Analysis". IEEE Transactions on Circuits and Systems for Video Technology, vol. 25, No. 4, (2015), pp. 533-546.
Yang, Ren, et. al., "Decoder-Side HEVC Quality Enhancement With Scalable Convolutional Neural Network". IEEE International Conference on Multimedia and Expo (ICME), Jul. 10-14, 2017, pp. 817-822.
Shi, Wenzhe, et. al., "Real-Time Single Image and Video Super-Resolution Using an Efficient Sub-Pixel Convolutional Neural Network". Proceedings of the IEEE Conference on Computer Vision and Pattern Recognition, (2016), pp. 1874-1883.
Chen, Tong, et. al., "DeepCoder: A Deep Neural Network Based Video Compression". IEEE Visual Communications and Image Processing (VCIP), (2017), 4 pages.
Yan, Ning, et. al., "A Convolutional Neural Network Approach for Half-Pel Interpolation in Video Coding". IEEE International Symposium on Circuits and Systems (ISCAS), (2017), 4 pages.
Pfaff, Jonathan, et. al., "Intra Prediction Modes based on Neural Networks". Joint Video Experts Team (JVET) of ITU-T SG 16 WP 3 and ISO/IEC JTC 1/SC 29/WG 11, JVET-J0037-v1, Apr. 10-20, 2018, pp. 1-14.
Pfaff, Jonathan, et. al., "Intra Prediction Modes based on Neural Networks". Joint Video Experts Team (JVET) of ITU-T SG 16 WP 3 and ISO/IEC JTC 1/SC 29/WG 11, JVET-J0037 Presentation, Apr. 13, 2018, 19 pages.
Merkle, Philipp, et. al., "CE3: Non-Linear Weighted Intra Prediction (Test 6.1.1)". Joint Video Experts Team (JVET) of ITU-T SG 16 WP 3 and ISO/IEC JTC 1/SC 29/WG 11, JVET-K0266-v1, Jul. 10-18, 2018, 4 pages.
Bailer, Werner, et. al., "Report of the AhG on Coded Representation of Neural Networks (NNR)". International Organization for Standardization, Coding of Moving Pictures and Audio, ISO/IEC JTC1/SC29/WG11 MPEG 2018/M42289, Apr. 2018, 3 pages.
Cheng, Zezhou, et. al., "Deep Colorization". Proceedings of the IEEE International Conference on Computer Vision, (2015), pp. 415-423.
Zhang, Rui, et al., "Fusion of Images and Point Clouds for The Semantic Segmentation of Large-Scale 3D Scenes Based on Deep Learning". ISPRS Journal of Photogrammetry and Remote Sensing, vol. 143, (2018), pp. 85-96.

\* cited by examiner

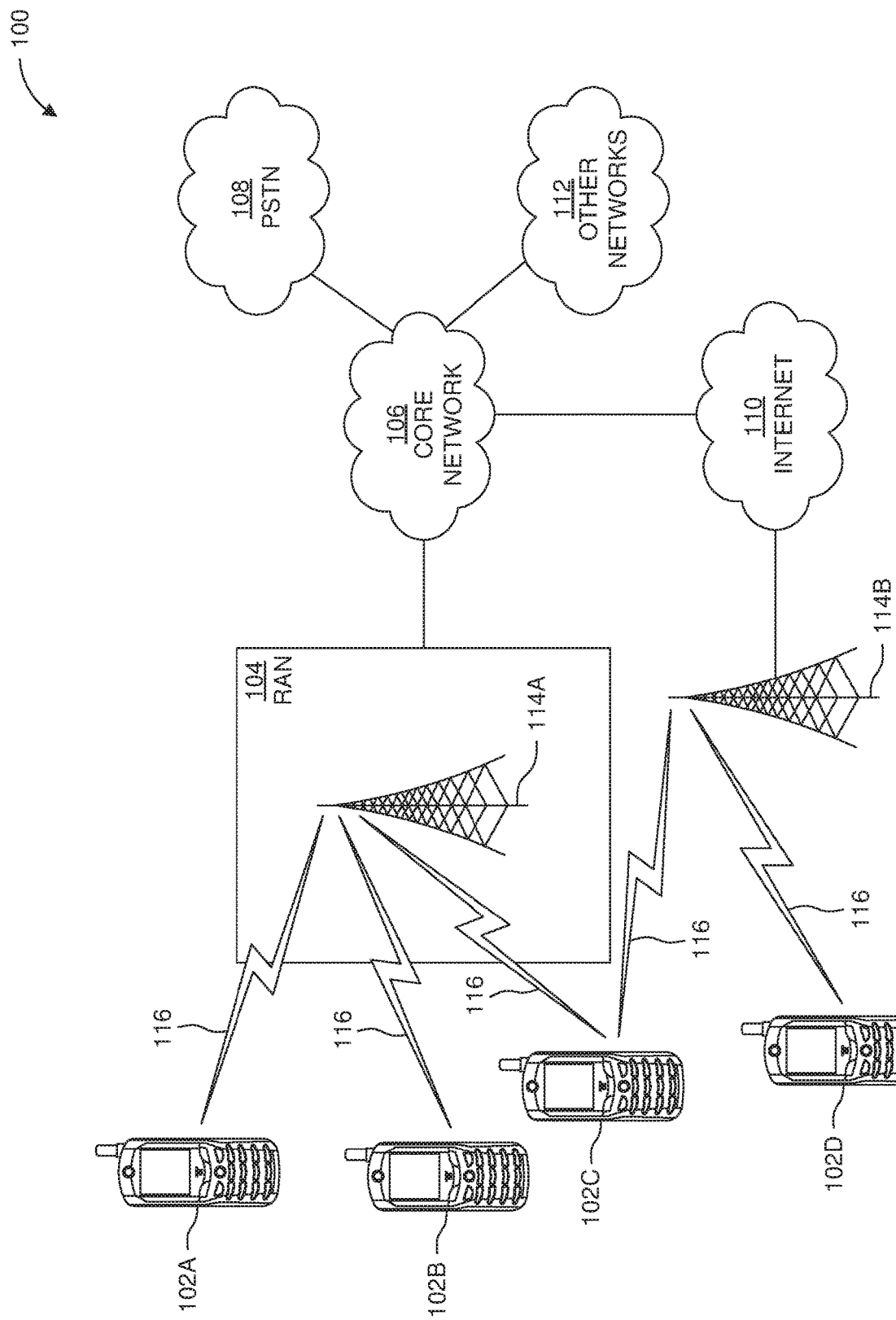

SYSTEM AND METHOD FOR DYNAMICALLY ADJUSTING LEVEL OF DETAILS OF POINT CLOUDS

CROSS-REFERENCE TO RELATED APPLICATIONS

The present application is a continuation application of U.S. patent application Ser. No. 16/982,373, entitled "SYSTEM AND METHOD FOR DYNAMICALLY ADJUSTING LEVEL OF DETAILS OF POINT CLOUDS," filed Sep. 18, 2020, which claims benefit under 35 U.S.C. § 371 of International Application No. PCT/US2019/021846, entitled "SYSTEM AND METHOD FOR DYNAMICALLY ADJUSTING LEVEL OF DETAILS OF POINT CLOUDS," filed on Mar. 12, 2019, which claims benefit under 35 U.S.C. § 119(e) from U.S. Provisional Patent Application Ser. No. 62/645,618, entitled "System and Method for Dynamically Adjusting Level of Details of Point Clouds," filed Mar. 20, 2018, each of which is hereby incorporated by reference in its entirety.

BACKGROUND

As virtual reality (VR) and augmented reality (AR) platforms are moving toward increasing consumer adoption, demand for fully three dimensional (3D) spatial content viewing is growing. The traditional de facto standard for such fully 3D content has been polygonal 3D graphics, manually produced by modeling and rendered with tools and techniques used for creating real-time 3D games. However, emerging mixed reality (MR) displays and content capture technologies, such as RGB-D sensors and light field cameras, have set new potential evolving best practices regarding the manner in which immersive spatial 3D content may be produced and distributed.

Spatial capturing systems collecting point cloud data from real-world environments can produce large amounts of point cloud data that can be used as content for immersive experiences. However, capture devices that produce point clouds of real-world environments, often have limited accuracy and may operate best for relatively close-range observation. This potential limitation may often result in limited resolution and accuracy of the captured point clouds. Representing high level of details with point clouds may require large amounts of data that can burden or overwhelm data distribution bandwidth, potentially curtailing the practical or useable level of detail for a point cloud.

SUMMARY

An example method in accordance with some embodiments may include: receiving point cloud data representing one or more three-dimensional objects; tracking a viewpoint of the point cloud data; selecting a selected object from the one or more three-dimensional objects using the viewpoint; retrieving a neural network model for the selected object; generating a level of detail data for the selected object using the neural network model; replacing, within the point cloud data, points corresponding to the selected object with the level of detail data; and rendering a view of the point cloud data.

In some embodiments of the example method, generating the level of detail data for the selected object may include hallucinating additional details for the selected object.

In some embodiments of the example method, hallucinating additional details for the selected object may increase sampling density of the point cloud data.

In some embodiments of the example method, generating the level of detail data for the selected object may include using a neural network to infer details lost due to a limited sampling density for the selected object.

In some embodiments of the example method, using a neural network to infer details lost for the selected object may increase sampling density of the point cloud data.

The example method in accordance with some embodiments may further include: selecting a training data set for the selected object; and generating the neural network model using the training data set.

In some embodiments of the example method, the level of detail data for the selected object may have a lower resolution than the points replaced within the point cloud data.

In some embodiments of the example method, the level of detail data for the selected object may have a greater resolution than the points replaced within the point cloud data.

In some embodiments of the example method, selecting the selected object from the one or more three-dimensional objects using the viewpoint may include responsive to determining a point distance between an object picked from the one or more three-dimensional objects and the viewpoint is less than a threshold, selecting the object as the selected object.

The example method in accordance with some embodiments may further include: detecting, at a viewing client, one or more objects within the point cloud data, wherein selecting the selected object may include selecting the selected object from the one or more objects detected within the point cloud data.

The example method in accordance with some embodiments may further include: capturing, at a viewing client, data indicative of user movement; and setting the viewpoint using, at least in part, the data indicative of user movement.

The example method in accordance with some embodiments may further include: capturing motion data of a head mounted display (HMD); and setting the viewpoint using, at least in part, the motion data.

In some embodiments of the example method, retrieving the neural network model for the selected object may include responsive to determining a viewing client lacks the neural network model, retrieving, from a neural network server, the neural network model for the selected object.

In some embodiments of the example method, retrieving the neural network model may include retrieving an updated neural network model for the selected object.

The example method in accordance with some embodiments may further include: identifying, at a first server, a second server; and transmitting, to a client device, an identification of the second server, wherein retrieving the neural network model may include retrieving the neural network model from the second server.

In some embodiments of the example method, retrieving the neural network model may include: requesting, at a point cloud server, the neural network model; receiving, at the point cloud server, the neural network model; and transmitting, to a client device, the neural network model.

In some embodiments of the example method, receiving point cloud data may include receiving point cloud data from a sensor.

An example system in accordance with some embodiments may include: one or more processors; and one or more non-transitory computer-readable mediums storing instructions that are operative, when executed by the processor, to perform any of the methods mentioned above.

The example system in accordance with some embodiments may further include one or more graphics processors.

The example system in accordance with some embodiments may further include one or more sensors.

Another example method in accordance with some embodiments may include: receiving point cloud data representing one or more three-dimensional objects; tracking a viewpoint of the point cloud data; selecting a selected object from the one or more three-dimensional objects using the viewpoint; retrieving a neural network model for the selected object; generating an increased level of detail data for the selected object using the neural network model; replacing, within the point cloud data, points corresponding to the selected object with the increased level of detail data; and rendering a view of the point cloud data.

Another example system in accordance with some embodiments may include: one or more processors; and one or more non-transitory computer-readable mediums storing instructions that are operative, when executed by the processor, to perform any of the methods mentioned above.

Another example method in accordance with some embodiments may include: receiving point cloud data representing one or more three-dimensional objects; receiving a viewpoint of the point cloud data; selecting a selected object from the one or more three-dimensional objects using the viewpoint; retrieving a neural network model for the selected object; generating a level of detail data for the selected object using the neural network model; and replacing, within the point cloud data, points corresponding to the selected object with the level of detail data.

Another example system in accordance with some embodiments may include: one or more processors; and one or more non-transitory computer-readable mediums storing instructions that are operative, when executed by the processor, to perform any of the methods mentioned above.

BRIEF DESCRIPTION OF THE DRAWINGS

A more detailed understanding may be had from the following description, presented by way of example in conjunction with the accompanying drawings. Furthermore, like reference numerals in the figures indicate like elements.

FIG. 1A is a system diagram of an example system illustrating an example communications system according to some embodiments.

Figure 1B:
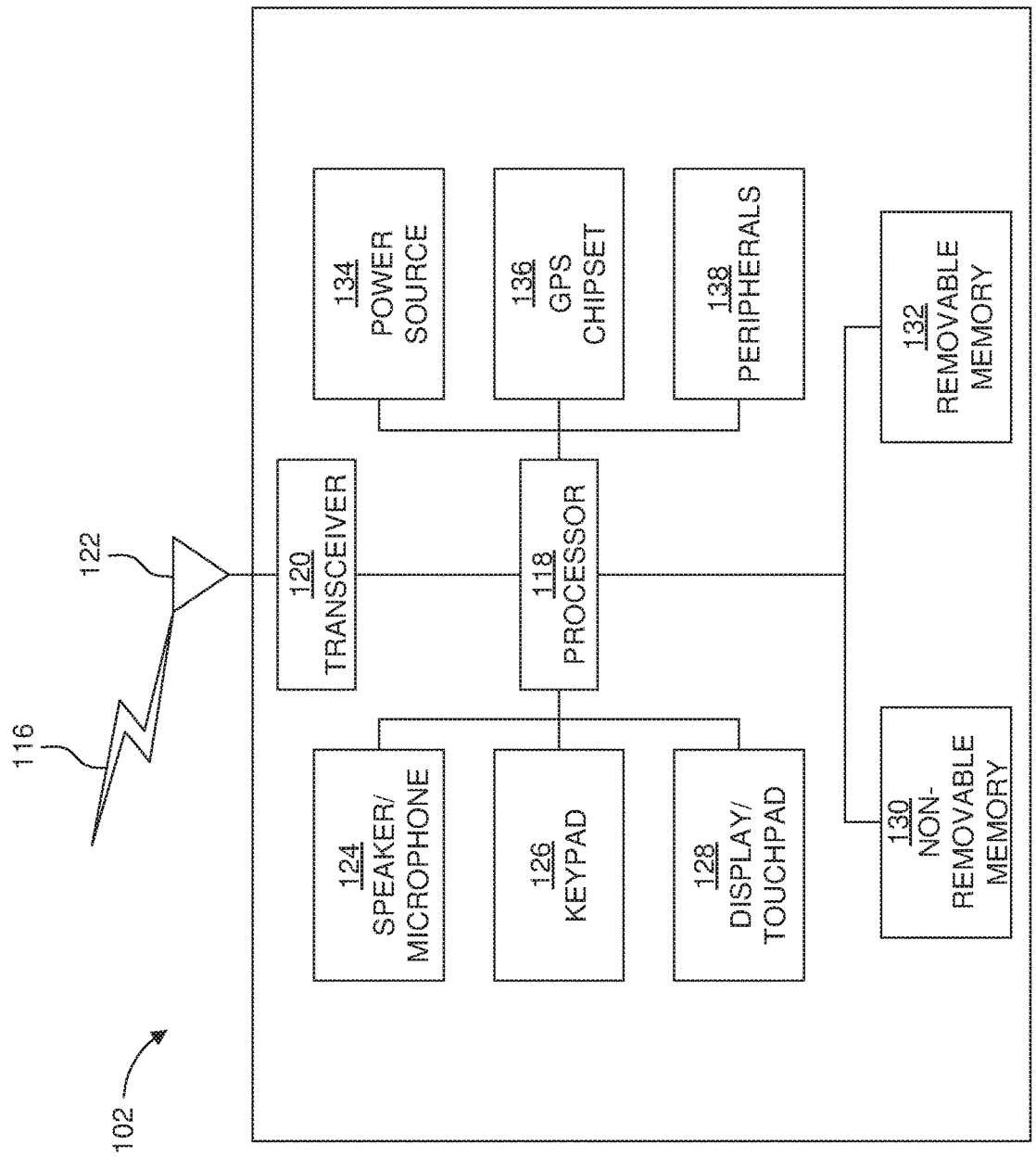
FIG. 1B is a system diagram of an example system illustrating an example wireless transmit/receive unit (WTRU) that may be used within the communications system illustrated in FIG. 1A according to some embodiments.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "In at least one embodiment, . . . ." For brevity and clarity of presentation, this implied leading clause is not repeated ad nauseum in the detailed description.

EXAMPLE NETWORKS FOR IMPLEMENTATION OF THE EMBODIMENTS

A detailed description of illustrative embodiments will now be described with reference to the various figures. Although this description provides a detailed example of possible implementations, it should be noted that the details are intended to be exemplary and in no way limit the scope of the application.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

In view of FIGS. 1A-1B, and the corresponding description of FIGS. 1A-1B, one or more, or all, of the functions described herein with regard to one or more of: WTRU 102a-d, Base Station 114a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

For some embodiments, the level of detail in point cloud-based content may be dynamically adjusted based on a viewing location and perspective. In some embodiments, dynamic adjustment of point cloud data may reduce or increase the level of detail from the original raw point cloud features, enabling efficient point cloud data transmission and enhanced user experience. Enhanced resolution may be achieved through example disclosed methods of neural network hallucination in accordance with some embodiments. Use of a non-uniform point density scheme in accordance with some embodiments permits matching sampling density to visualization requirements for an active viewing location. Some embodiments disclosed herein may include a viewing client combining point cloud data streamed by a point cloud server with neural networks that the viewing client obtains from a neural network server, to, e.g., enable dynamic adjustment of level of detail over a wide range. In some embodiments, the point cloud server may reduce the level of detail of the original point cloud data, while the viewing client may simulate recovery of the detailed point cloud elements using the neural network models.

An example method in accordance with some embodiments of providing a three dimensional (3D) rendering of point cloud data may include setting a viewpoint for point cloud data; requesting the point cloud data; responsive to receiving the point cloud data, selecting an object within the point cloud data for which a level of detail is to be increased; requesting a neural network model for the object; responsive to receiving the neural network model for the object, increasing the level of detail for the object; replacing points within the received point cloud data, corresponding to the object, with the increased detail data from the neural network model; and rendering a 3D view of the point cloud data. According to the example method, increasing the level of detail for the object may include hallucinating additional details for the object. The method may also include, at a viewing client, detecting objects within the received point cloud data. The method may also include, at a viewing client, capturing user navigation or motion of a head mounted display (HMD), and setting the viewpoint, at least partially, based on the captured user navigation. The method may also include, at a viewing client, determining that a new model is needed for the object, and wherein requesting a neural network model for the object comprises: responsive to determining that a new model is needed for the object, requesting a neural network model for the object.

An example method in accordance with some embodiments of providing a 3D rendering of point cloud data may include receiving point cloud data; segmenting the point cloud data; detecting an object within the point cloud data; assigning level of detail labels for points within the point cloud; responsive to receiving a request from a client to provide the point cloud data; identifying a viewpoint associated with the received request; and selecting a region of the point cloud to reduce resolution, based on the viewpoint; reducing the resolution for the selected region; and streaming the point cloud data with the reduced resolution and an identification of the detected object to the client. According to the example method, receiving point cloud data may include receiving point cloud data from a sensor. The method may also include, at a point cloud server, identifying a neural network server; and transmitting an identification of the neural network server to the client. The method may also include, at a point cloud server, retrieving a neural network model; and transmitting the neural network model to the client.

A system may include a processor (e.g., one or more processors) and a non-transitory computer-readable medium storing instructions that are operative, when executed by the processor, to perform, e.g., any of the methods described herein in accordance with some embodiments. In some embodiments, an example system may include a graphics processor.

The increasing adoption of virtual reality (VR), augmented reality (AR), and mixed reality (MR) systems is increasing demand for fully three dimensional (3D) spatial content, such as point cloud data that may be collected from real-world environments (in real time or near real time) with RGB-D sensors, light field cameras, and light detection and ranging (LIDAR) systems.

Beyond MR driving the development of reality capture technologies, human-computer interactive systems are likely to become increasingly spatially aware. Environmental sensing technologies enabling structural understanding of the environment are increasingly being embedded with smart home environments, automotive systems and mobile devices. These spatially aware systems may collect point cloud data from the environment to produce large amounts of point cloud data which may be used as content for immersive experiences. Unfortunately, the resolution of the point cloud and sensor accuracy may limit the level of details the content might have and therefore limit the distance from how close captured geometry may be inspected without the quality of the visualization suffering from the manifestation of low-resolution resolution artifacts. The bandwidth required for point cloud data transmission may also limit displayed resolution. However, this may in some cases be mitigated by dynamically adjusting point cloud resolution based on the viewing distance. A blog article from a website for Umbra, entitled *Visualization of Large Point Clouds*, UMBRA, Apr. 7, 2016, formerly available at https://umbra3d.com/blog/visualization-of-large-point-clouds/ (available at https://web.archive.org/web/20160512052944/http://umbra3d.com/visualization-of-large-point-clouds) (last visited Feb. 28, 2019) describes a method for point cloud streaming used in an Umbra optimization system. The original data capture is understood to set an upper limit on the true resolution of fine details, which may then be lowered with any adjustments based on point reduction.

Deep learning neural networks, including convolutional neural networks, have seen rapid, wide scale adoption for image analysis and computer vision. Methods developed for analyzing 2D image data often may be adapted for processing spatial 3D data. Although early approaches for applying machine learning for 3D data required transformation of the 3D data to a volumetric format (i.e., to volume pixels (voxels) or binary space partition representations), more recent work allows neural networks to process point cloud data in its native format. For example, the journal article QI, Charles R., et al., *Pointnet: Deep Learning on Point Sets for 3D Classification and Segmentation,* 1(2) PROC. COMPUTER VISION AND PATTERN RECOGNITION (CVPR) 4 (2016) ("Qi") describes such a system. This recent work, e.g., Qi, is understood to have included 3D analysis using neural networks for point cloud data segmentation, along with object detection and recognition.

Unfortunately, point cloud data resulting from spatial capture of the real world physical scenes may result in high memory consumption, even with low resolution, and sensor noise. High memory consumption may limit the resolution with which complex scenes may be transmitted to the clients that are consuming the data. However, as some point cloud data may lack topology, the level of details of the point cloud data may be lowered, in some situation, by reducing the sampling density according to the viewpoint. Adjusting of the sampling density may enable more efficient transmission of large point clouds. One potentially negative result, though is that the resolution may cause a reduction in the quality of the viewing experience, when inspecting individual elements featured in a point cloud scene from close range.

An increase of content quality may be used to provide a more realistic viewing experience when the content is captured from relatively close distances. In some embodiments, the level of details for point clouds may be adjusted based on the viewpoint, e.g., (1) to reduce the level of details from the original raw point cloud data if the viewing distance permits, and (2) to enable a dynamic simulated (hallucinated) increase of the level of detail. For some embodiments, a six degrees of freedom (6DoF) viewing experience may be used with efficient bandwidth usage, such as if the viewing distance is sufficiently close to an object.

Some embodiments enable dynamic adjustment of point cloud data, e.g., in both directions, which may both reduce and increase the level of detail of the point cloud from the originally-collected raw point cloud features. In some embodiments, the level of details may be adjusted dynamically, based on the viewpoint, enabling efficient point cloud data transmission and non-uniform point density, so that the point density of the point cloud matches that which may be used in some applications to produce high quality visualization for the active viewpoint. In some embodiments, the viewing client may combine point cloud data streamed by a point cloud server with neural networks obtained from a neural network server (which may be different or the same server). In some embodiments, the point cloud server may reduce the level of detail of the original point cloud data for transmission to the client, and the viewing client may simulate an increase in the level of detail using one or more neural networks the viewing client has received. The result is a dynamic adjustment of level of detail over a wide range. For some embodiments, the term "neural network models" may be used in place of the term "neural networks" used herein.

Figure 2:
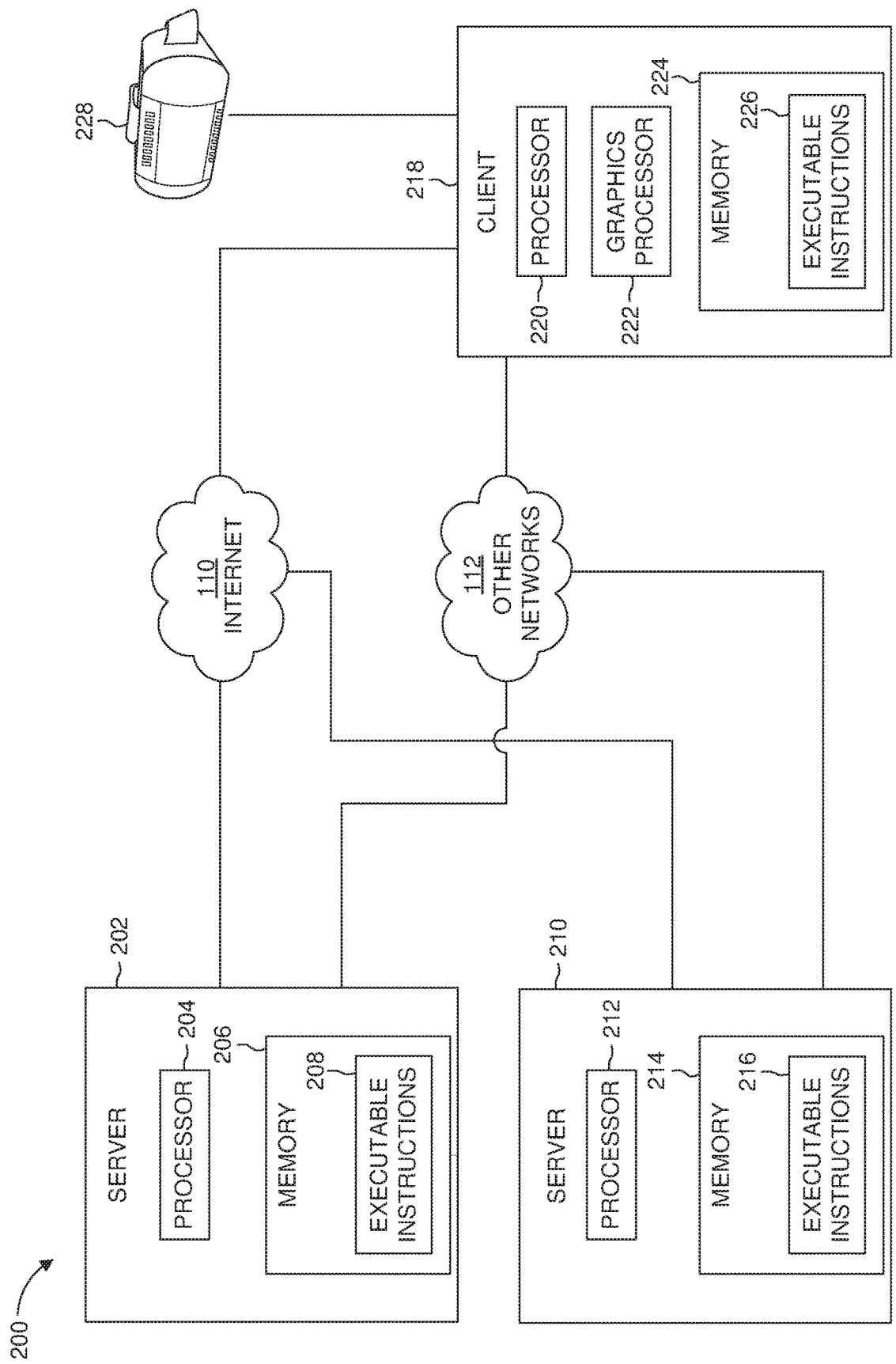
FIG. 2 is a system interface diagram illustrating an example set of interfaces for two servers and a client, according to some embodiments.

FIG. 2 is a system interface diagram illustrating an example set of interfaces for two servers and a client, according to some embodiments. According to the example, one server 202 may be a point cloud server, and the other server 210 may be a neural network server. In some embodiments, the servers may coincide. Both servers are connected to the internet 110 and other networks 112. A client 218 is also connected to the internet 110 and other networks 112, enabling communication among all three nodes 202, 210, 218. Each node 202, 210, 218 comprises a processor 204, 212, 220, a non-transitory computer readable memory storage medium 206, 214, 224, and executable instructions 208, 216, 226 contained within the storage medium 206, 214, 224, that are executable by the processor 204, 212, 220 to carry out methods or portions of methods disclosed herein. As illustrated, the client may include for some embodiments a graphics processor 222 for rendering 3D video for a display, such as a head mounted display (HMD) 228. Any or all of the nodes may comprise a WTRU and communicate over the networks, as described above with respect to FIGS. 1A-1B.

For some embodiments, a system 200 may include a point cloud server 202, a neural network server 210, and/or a client 218 that includes one or more processors 204, 212, 220; and one or more non-transitory computer-readable mediums 206, 214, 224 storing instructions 208, 216, 226 that are operative, when executed by the processor 204, 212, 220, to perform a method disclosed herein. For some embodiments, a node 218 may include one or more graphics processors 222. For some embodiments, a node 202, 210, 218 may include one or more sensors.

Figure 3A:
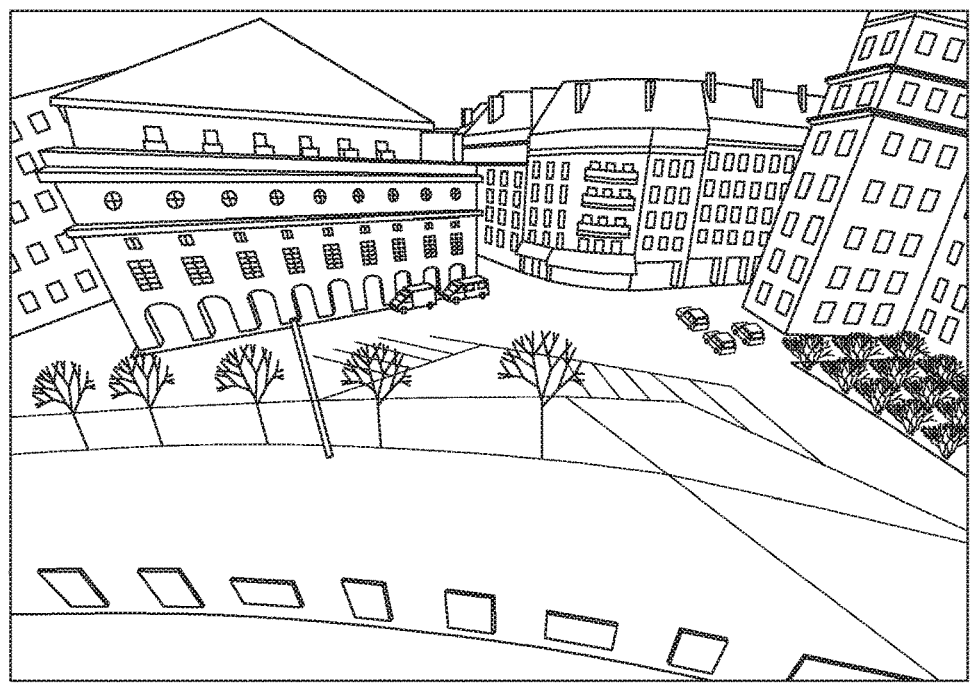
FIG. 3A is a schematic perspective view illustrating an example point cloud of a scene that may be captured and processed by some embodiments.

FIG. 3A is a schematic perspective view illustrating an example point cloud of a scene that may be captured and processed by some embodiments. The scene 300 includes multiple buildings at a distance and some closer objects, imaged from an observer viewpoint with some apparent height. As an observer viewpoint changes, such as by moving lower or closer to the buildings, the relative angles to the points within the point cloud may change. Point clouds may be detected in real-world scenes, generated with virtual objects, or any combination of these or other techniques as applicable.

Figure 3B:
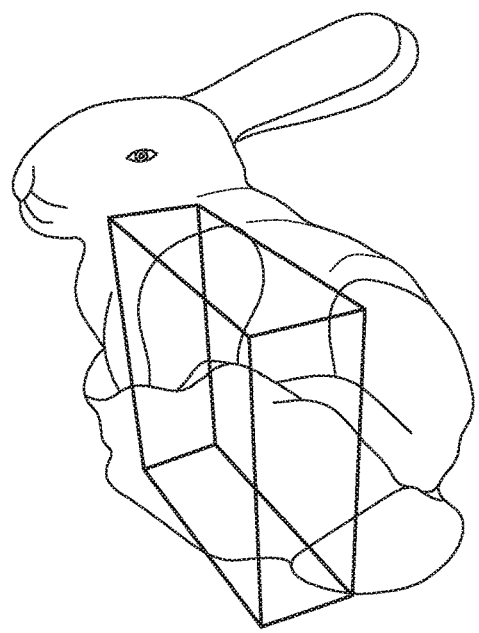
FIG. 3B is a schematic perspective view illustrating an example point cloud of an object that may be captured and processed by some embodiments.

FIG. 3B is a schematic perspective view illustrating an example point cloud of an object that may be captured and processed by some embodiments. FIG. 3B is a two-dimensional black and white line drawing of a three-dimensional point cloud object 350. Within a three-dimensional display environment, a point cloud object has points that represent three-dimensional coordinates in which a portion of an object has been detected to exist. Such detection may occur using, e.g., 3D sensors, such as light detection and ranging (LIDAR), stereo video, and RGB-D cameras. The point cloud data may include, e.g., 3D location and radiance image data or voxels.

Figure 4:
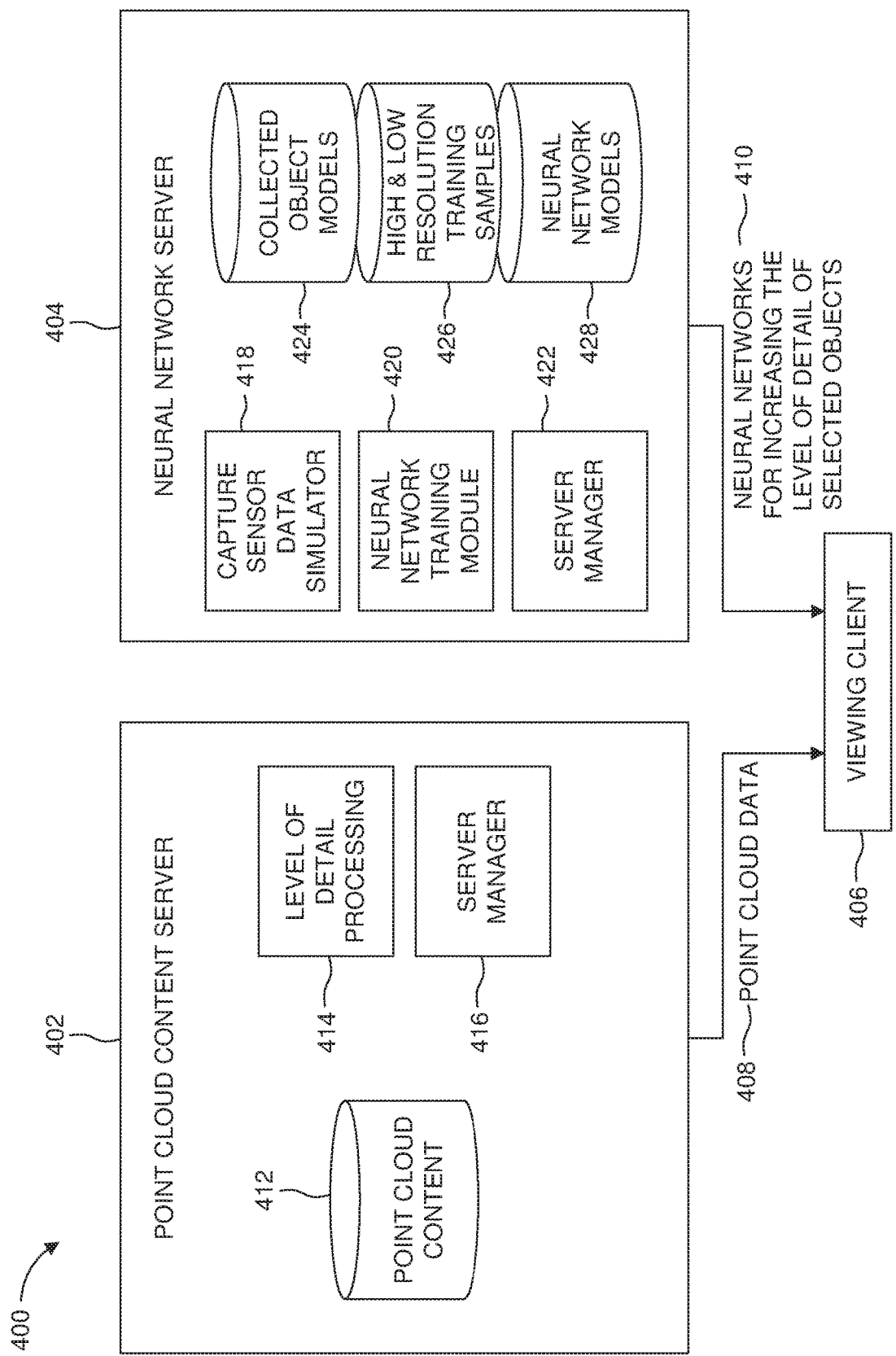
FIG. 4 is a system interface diagram illustrating an example set of interfaces for a set of servers and a client, according to some embodiments.

FIG. 4 is a system interface diagram illustrating an example set of interfaces for a set of servers and a client, according to some embodiments. The server (e.g., point cloud content server) 402 may include a database of point cloud content 412, logic for processing the level of detail 414, and a server management function 416. In some embodiments, the processing for detail may reduce the resolution for transmission to a client 406 (e.g., viewing client 406), such as due to bandwidth limitations or as permitted because the viewing distance is sufficient to permit a reduction. The server (e.g., neural network server) 404 may include a database of collected object models 424, a database of high and low resolution training samples 426, and a database of neural network models 428. The neural network server 404 additionally may include logic to capture data from a sensor data simulator 418, a neural network training module 420, and a server management function 422. Both servers 402, 404 are in communication with the client 406.

For some embodiments, point cloud data rendered for a viewer may undergo a process of data construction from at least two different sources to reduce and/or increase the level of detail. One of the sources may be point cloud data 408 streamed from the point cloud server 402 to the viewing client 406. The point cloud server 402 streams the point cloud data 408 in the resolution that the spatial capturing has provided, or, for some embodiments, down-sampled in order to comply with, e.g., bandwidth constraints or viewing distance tolerances. The point cloud server 402 may dynamically reduce the level of detail. Another of the sources may be a repository of neural networks 410 that may be used for simulating an increased level of details in the point cloud data by hallucinating or inferring additional geometric details. In some embodiments, neural networks used for increasing the level of detail through hallucination may be trained on a per object basis, using synthetic data that is available from existing 3D object model repositories.

For some embodiments, efficiencies may be gained by optimizing system-level operations; in addition to streaming the point cloud data and lowering the resolution (as needed or permitted), in some embodiments, the point cloud server also may segment the point cloud data and identify objects within the point cloud. If the point cloud server provides the segmentation and object recognition information to the viewing client, the client may request specific corresponding neural network models that may be tailored for hallucinating added (or lessened) details to that particular geometry (which may increase or decrease the level of detail for the object). This process permits navigating even large point cloud scenes efficiently, while simultaneously observing individual elements of the point cloud from close range at a sufficiently high level of detail. In some embodiments, points within point cloud data corresponding to a selected object may be replaced with lower resolution data.

Figure 5:
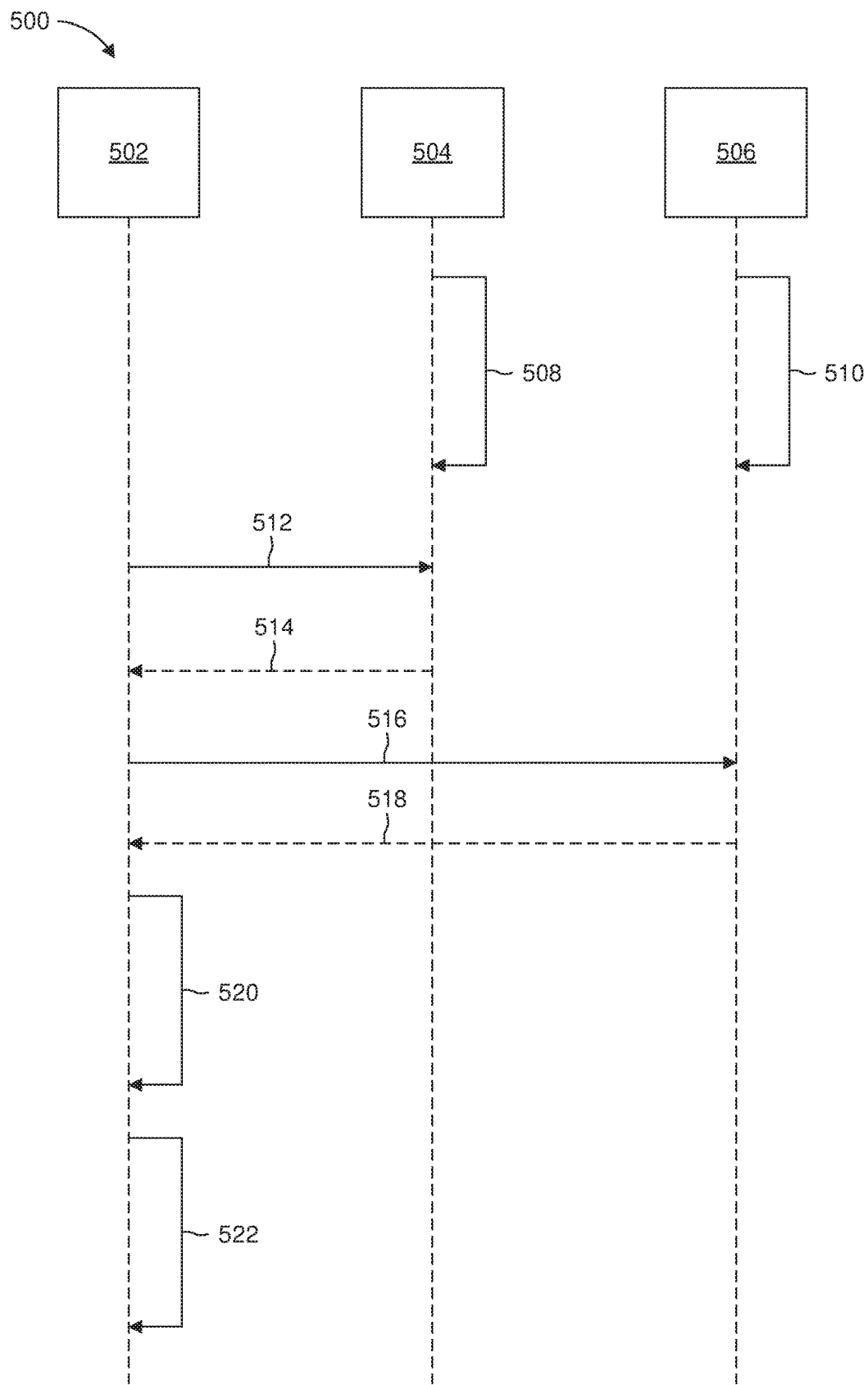
FIG. 5 is a message sequence diagram illustrating an example process, according to some embodiments.

FIG. 5 is a message sequence diagram illustrating an example process, according to some embodiments. In the example message sequence 500 there are three nodes, one client and two servers, e.g.: a viewing client 502, a point cloud server 504, and a neural network server 506. The communication among the nodes 502, 504, 506 is illustrated, although internal functions at each of the three nodes 502, 504, 506 is explained in further detail in the descriptions of FIGS. 6, 7 and 8, respectively.

The point cloud server 504 processes 508 point clouds to allow processing for a tailored level of detail, taking into account, for example, streaming constraints (time and bandwidth), viewing distance, and detection of objects that may permit rapid reconstruction at the viewing client, using a neural network model. The neural network server 506 collects 510 high resolution 3D models, simulates low version capture versions from the models, and trains neural networks on reconstructing the higher level of detail to later use in simulating an increase in the level of detail for a similar low resolution model. The point cloud server and neural network server wait for the viewing client 502 to begin a session.

The viewing client 502 sends 512 a request for a point cloud to the point server, along with an indication of a viewpoint (e.g., a "view from" location). The viewpoint may be specified, in some embodiments, as an origin point and a pointing unit vector. For some embodiments, other specification formats may be used. The point cloud server 504 returns 514 point cloud data at the selected resolution. The point cloud data may be accompanied by indications of detected objects. The client 502 requests 516 neural network models for selected objects, based on what the client may use to increase viewing resolution for some set of objects. The objects may include objects identified by the point cloud server, and may further include objects detected by the client itself. The neural network server 506 returns 518 the applicable neural network models. The client 502 may increase 520 the level of detail using the received neural network models and render 522 the point cloud content for viewing by a user.

Figure 6:
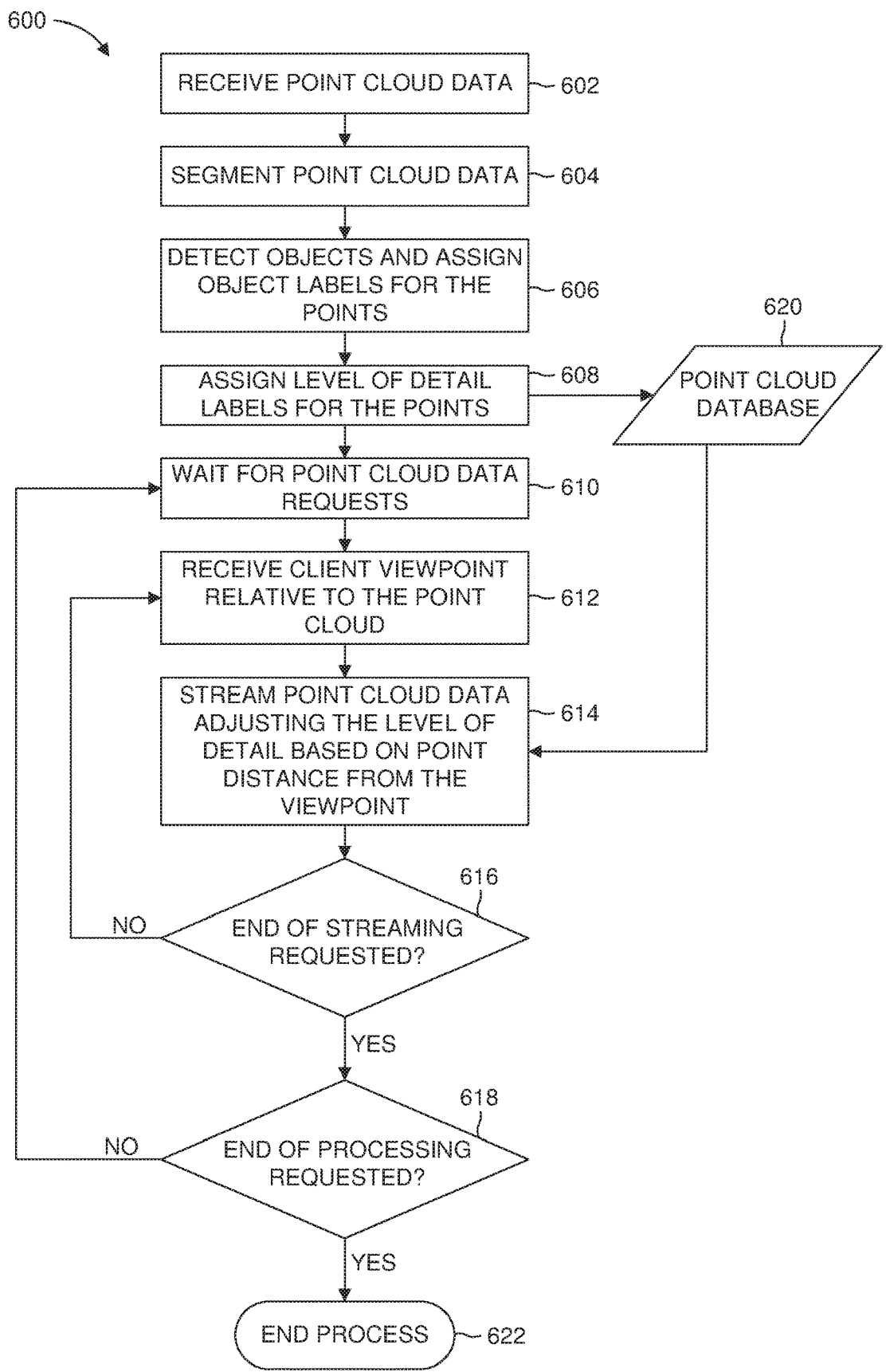
FIG. 6 is a flowchart illustrating an example process performed by a server, according to some embodiments.

FIG. 6 is a flowchart illustrating an example process performed by a server, according to some embodiments. The example process 600 performed by a server (e.g., a point cloud content server such as point cloud content server 402 of FIG. 4) may include: receiving 602 point cloud sensor data and process the point cloud sensor data for level of detail information; segmenting 604 point cloud data; detecting 606 objects within the point cloud data; assigning 608 level of detail labels for the points (e.g., putting labels into, e.g., a point cloud database 620); waiting 610 for a viewing client request; receiving 612 a client request, including a viewpoint; adjusting 612 point cloud data (using data stored in the point cloud database) and streaming the adjusted point cloud data to the client; monitoring 616 for a condition (e.g., whether an end streaming request has been received) to terminate the streaming; and monitoring 618 for a condition (e.g., whether an end processing request has been received) to terminate 622 the processing.

In some embodiments, the point cloud server may store and distribute point cloud data. Point cloud data may include, for example, unordered point samples of a scene, geometry represented as a coordinate location of each point, and may further include, for example, per point characteristics such as color, brightness, surface normal vector, and any additional data as applicable. Such data may in some cases be typical of data produced by some LIDAR systems. A point cloud may be obtained from multiple sources, e.g., including capturing from locally or remotely connected sensors, and downloading from other distribution sources. If the point cloud server has received new point cloud data, the point cloud server may process the data to enable distribution optimization, based on a client-specific level of detail adjustment. The point cloud server may stream the point cloud data to the viewing clients so that the level of detail (or the point density in some volume or region for some embodiments) may depend upon the data points' virtual distance from the client's specified viewpoint. With the level of detail based streaming enabled, the point cloud data may be dynamically reduced by omitting details that are not visible to the viewing client. The result according to the example is streaming a lower level of detail than that which the point cloud server has stored. For some embodiments, selecting a three-dimensional object within a point cloud using a viewers viewpoint may include selecting the object if the point distance between the viewpoint and the object is less than a threshold. For some embodiments, one or more objects may be detected within a point cloud, and selecting a three-dimensional object within the point cloud may include selecting one of the detected objects.

During the level of detail processing, for some embodiments, the point cloud server estimates the density of the stored point cloud areas and assigns each point with a level of detail identity so that, depending on the viewing distance, oversampling may be avoided. That is, according to the example, details that are not visible from the specified viewpoint are removed and sampling of multiple points per final rendered image pixel may be avoided. In accordance with some embodiments, in addition to assigning level of detail identities to the points, the point cloud also may be identified as segments for more effective streaming. See, for example, the website for Umbra, entitled *Visualization of Large Point Clouds*, UMBRA, Apr. 7, 2016, formerly available at https://umbra3d.com/blog/visualization-of-large-point-clouds/(available at https://web.archive.org/web/20160512052944/http://umbra3d.com/visualization-of-large-point-clouds) (last visited Feb. 28, 2019), which describes a method for point cloud streaming used in an Umbra optimization system.

In some embodiments, the point cloud server also may segment the point cloud data for streaming and object detection and recognition. Point cloud segments may be, e.g., assigned with detected object labels, so that the viewing client may request neural networks that correspond to those particular object labels. FIG. 6 illustrates a flowchart of an example method that may be performed by a point cloud server (such as point cloud content server 402), according to some embodiments. In some embodiments, the flowchart of FIG. 6 may be performed by a device that also performs the flowcharts of FIGS. 7, 8, and/or 9. For some embodiments, retrieving a neural network model may include: requesting, at a point cloud server, the neural network model; receiving, at the point cloud server, the neural network model; and transmitting, to a client device, the neural network model.

Figure 7:
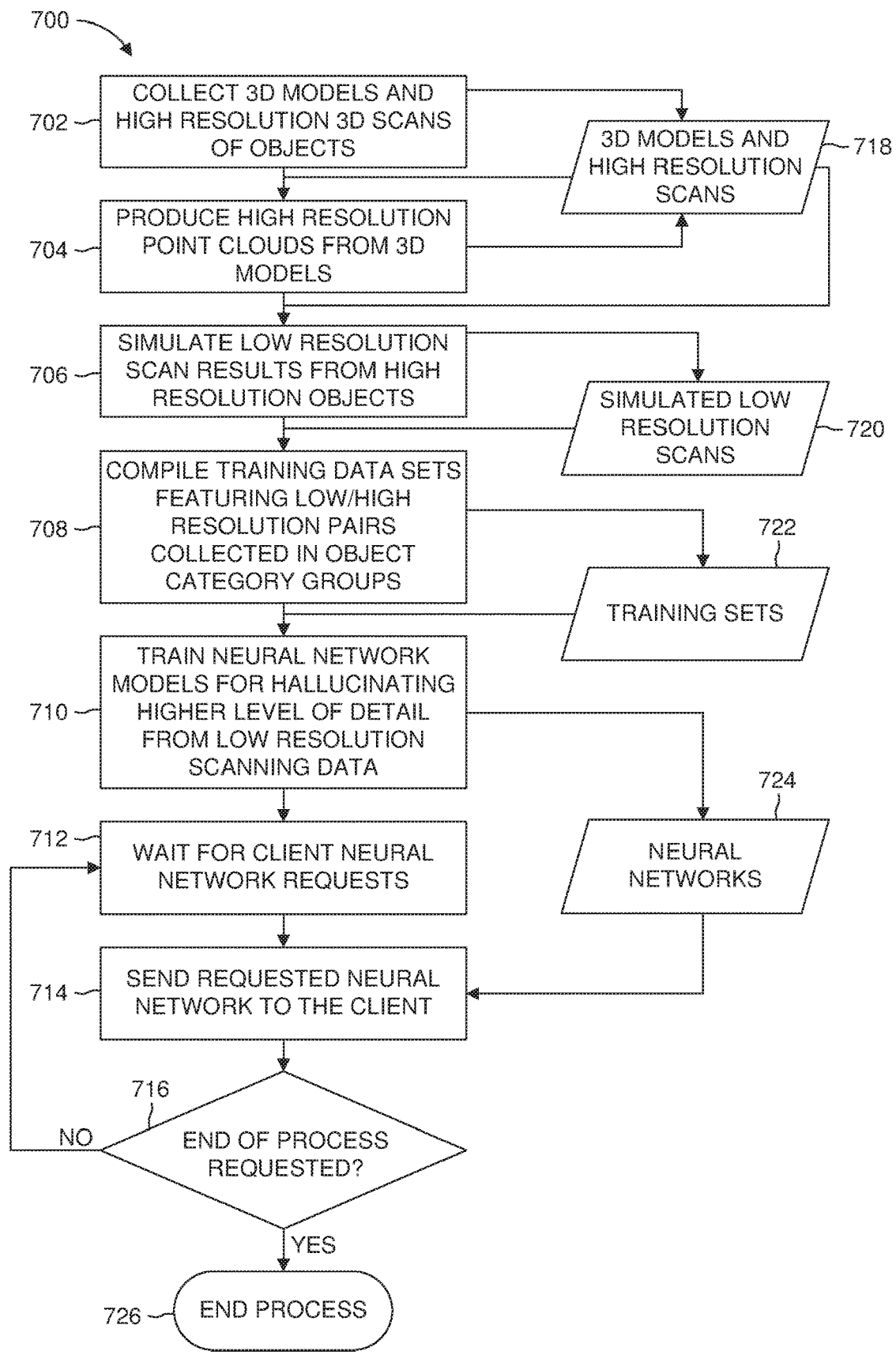
FIG. 7 is a flowchart illustrating an example process performed by a server, according to some embodiments.

FIG. 7 is a flowchart illustrating an example process performed by a server, according to some embodiments. The example process 700 performed by the server (e.g., a neural network server such as example server 404) may include: collecting 702 synthetic and high resolution 3D scanned models of objects and storing 718 those objects in a database; producing 704 high resolution point clouds from the 3D models; simulating 706 low resolution scan results based on the high resolution objects and storing 720 the simulated low resolution scan results; compiling 708 training data sets featuring high/low resolution pairs, collected in object category groups, and storing 722 these as training sets; training 710 neural network models for hallucinating higher levels of detail from low resolution data, using the training sets, and storing the neural network models; waiting 712 for a viewing client request; receiving 724 a client request for neural networks; sending 714 the requested neural networks from stored neural network models; and monitoring 716 for a condition to terminate 726 the process.

In some embodiments, the neural network server may be responsible for constructing neural networks that may be used for hallucinating (e.g., simulating or otherwise adjusting or generating, e.g., dynamically simulating, adjusting and/or generating) increased level of details for objects represented as point clouds. Neural networks may be trained using high resolution point cloud models collected from existing 3D models and high resolution 3D scans that are available in multiple 3D model repositories. In some embodiments, the neural network server collects and categorizes object models and produces training data by creating low resolution point cloud versions of the objects (to simulate low resolution 3D capture). Using the training data, neural networks may be trained to hallucinate increased levels of detail for object categories that are represented by or similar to a training data set.

For model training, existing 3D models of selected object categories and high resolution 3D scans may be collected into a training database from existing 3D model repositories and available model and 3D scan datasets. For neural network training, low resolution versions of the collected data may be produced by simulating 3D scanning of the objects with a spatial data capture method that produces lower resolution results. This process may be done by sampling objects with lower sample density with limited visibility and adding simulated typical sensor noise to the samples. Lower resolution point clouds, e.g., resulting from the spatial sensor capture simulation, also may be stored in the training database with links to the high resolution data.

For training, captured high resolution object point clouds and the low resolution object point clouds resulting from spatial capture simulation may be used as training pairs. Training pairs from the same or sufficiently similar objects may be collected to a training set. Similarity of object types may be determined by merging object types with sufficient similarity.

Neural network models used for increased level of detail hallucination may be constructed using convolutional neural networks (CNN) architectures, in accordance with some embodiments. Trained neural networks may be used to produce a high resolution version of a low resolution point cloud input. For example, for constructing a CNN neural network architecture and training the model, a deep learning framework or a higher level neural network API running on top of a deep learning framework may be used. The conference paper Liang, Shu, et al., *3D Face Hallucination from*

*a Single Depth Frame*, 1 2014 2ND INTERNATIONAL CONFERENCE ON 3D VISION (3DV) 31-38 (2014) describes methods, for example, for hallucinating high resolution 3D models of faces from low resolution depth frames. These methods use examples of the types of neural network models that may be transmitted from the neural network server to the viewing client, in some embodiments, if the client requests a neural network model for increasing the level of detail of a "head" or "face". Some embodiments of a method for constructing and training networks of a specific object category may leverage hallucination techniques similar in at least some respects to, e.g., hallucinating an increased level of detail for a 3D face.

For some embodiments, a low resolution point cloud is used as input. For example, a neural network model may be trained to infer surface details to increase the density of the input point cloud. The journal article Yu, Lequan, et al., *PU-Net: Point Cloud Upsampling Network*, 2018 IEEE/CVF CONFERENCE ON COMPUTER VISION AND PATTERN RECOGNITION (CVPR) 2790-2799 (2018) ("Yu") describes an example technique that may be used in accordance with some embodiments to increase resolution of a point cloud by upsampling the data. According to the example implementation in Yu, a point cloud server process is understood to learn multi-level features per point and to expand the point set via a multi-branch convolution in the feature space. According to the example implementation in Yu, the expanded feature is split into multiple features, which are reconstructed into an upsampled point set.

Beyond certain example techniques that may be used or leveraged in some embodiments, for some embodiments, generating a level of detail for a selected object may include hallucinating additional details for the selected object. In some embodiments, points within point cloud data corresponding to a selected object may be replaced with higher resolution data. In some embodiments, a viewing client may capture user navigation data (or data indicative of user movement for some embodiments), and the viewing client may set the viewpoint to rendered data using, at least in part, the user navigation data. For some embodiments, the viewpoint may be adjusted by a vector that corresponds to a user movement vector, such that the user movement vector is a vector determined relative to an origin in a real world environment and the user movement vector is expressed as user navigation data. For some embodiments, retrieving a neural network model may include retrieving an updated neural network model for a selected object. For some embodiments, hallucinating additional details for a three-dimensional object may include, for example, inferring (or generating) a level of detail data for the object using a neural network model. For example, a set of points within a set of point cloud data may be selected such that the selected set of points represent a three-dimensional object. The selected set of points may correspond to a first resolution level. The selected points may be upsampled (or downsampled) using a neural network model to generate a set of points that correspond to a second resolution level. Upsampling (or downsampling) increases (or decreases) the sample point density for point cloud data. The second resolution level may represent a higher resolution than the first resolution level for some embodiments. For some embodiments, the second resolution may represent a lower resolution than the first resolution.

Figure 8:
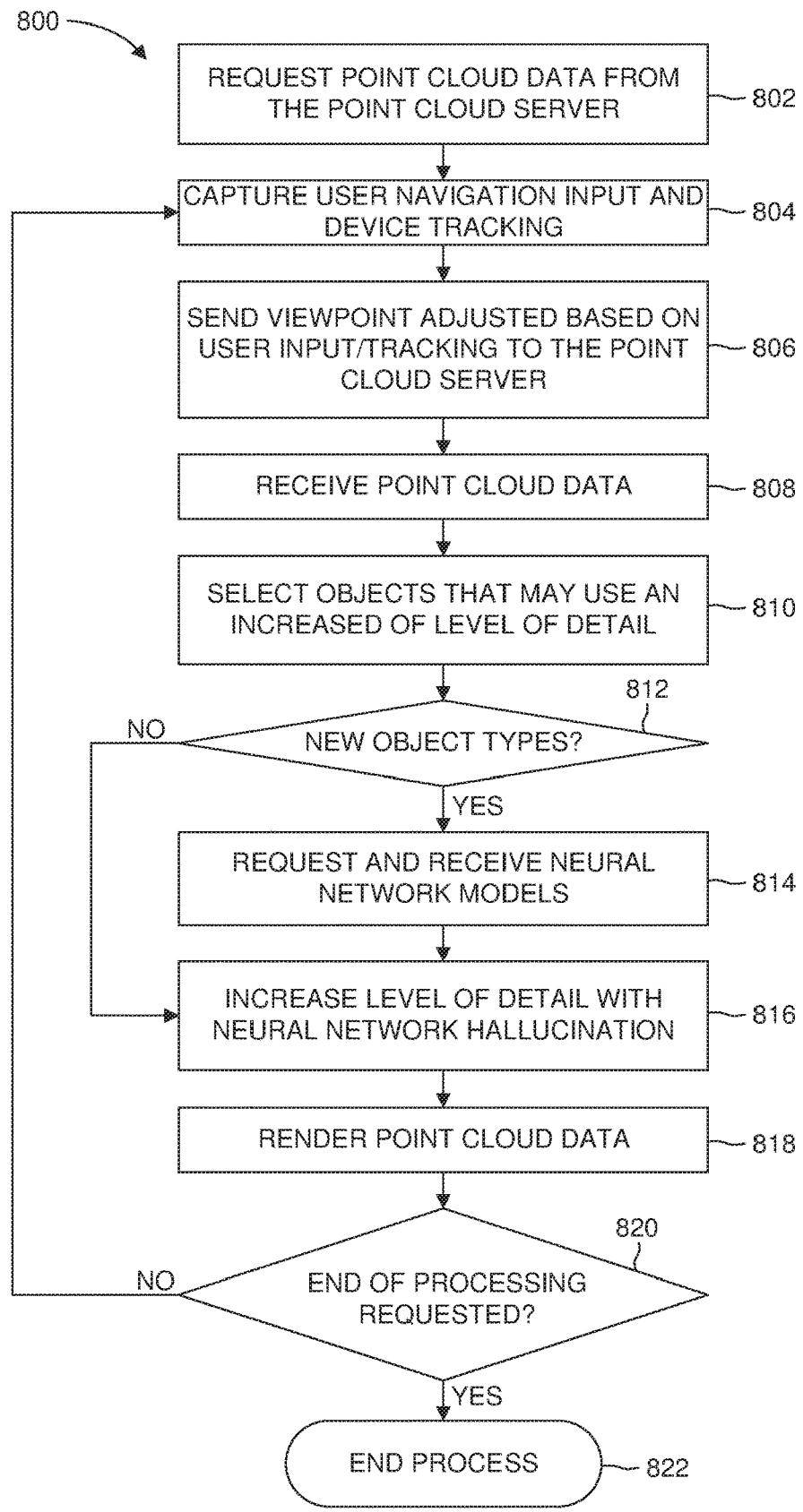
FIG. 8 is a flowchart illustrating an example process performed by a client, according to some embodiments.

FIG. 8 is a flowchart illustrating an example process performed by a client, according to some embodiments. The example method 800, which may be performed by a client (e.g., a viewing client such as viewing client 406 of FIG. 4), may include: requesting 802 point cloud content from the server; capturing 804 user navigation or device tracking to determine viewpoint; sending 806 to the point cloud server the viewpoint relative to the point cloud; receiving 808 point cloud data, which may be adjusted relative to a viewpoint for some embodiments; depending on the user controlled viewpoint, selecting 810 objects for which level of detail may be increased; determining 812 whether the objects correspond to new neural network models (or a new object type or object category for some embodiments) or whether the client already has the models; responsive to determining that the client lacks the new models, requesting 814 the new models from the neural network server and receiving the requested neural network models; using the neural network models (either recently received, or prior-existing) to increase 816 resolution and hallucinate a higher level of details for the selected objects; replacing the object segment in the point cloud streamed with the high resolution version produced using the neural network models; rendering 818 point cloud data to the viewer; and monitoring 820 for an indication to terminate 822 processing.

In some embodiments, the example process executed by the client may start with a user launching a point cloud viewing application. If the user starts the application, he/she also indicates the point cloud content to be viewed. Point cloud content may be a link to the content residing on a point cloud server. In some embodiments, the link to the content may be a URL identifying the point cloud server and specific content. The viewing client application may be, e.g., launched either by explicit command by the user, or automatically by the operating system based on identifying a content type request and application that is associated with the specific content type. A viewing client application may be a stand-alone program, may be integrated with a web browser or a social media client, or may be part of the client device operating system.

In addition to making the initial point cloud request, the viewing client also may continually send updated viewpoint information (relative to the point cloud) to the point cloud server, in some embodiments. The point cloud server adjusts, e.g., dynamically, the level of detail of the point cloud streamed to the client, as described previously. If the viewer client starts the process, the viewer client may start device tracking that may contribute to the viewpoint adjustment, for VR, MR, and AR use cases. For example, if the client includes a wearable display device such as a head mounted display (HMD), as the users head moves, sensors that detect HMD position and/or motion may update the viewpoint (e.g., responsively to the user's head movement(s)). For some embodiments, receiving point cloud data may include receiving point cloud data from a sensor. In some embodiments, in addition to device tracking, the user may control the viewpoint relative to the point cloud with some additional navigation input. If the viewing client initially requests point cloud data from the point cloud server, the viewing client may signal a default or specific viewpoint, for some embodiments. If the viewing client begins receiving point cloud data, the viewing client may update the viewpoint according to the user input and/or device tracking for rendering the received data. In some embodiments, rendering may be executed on a dedicated graphics processor, running parallel with the processing that the viewing client performs on the received point cloud data.

If the viewing client has received the point cloud data, the viewing client may identify object labels assigned for sets of points by the point cloud server. In some embodiments, the client may additionally identify objects. Using the object labels, the viewing client may determine which objects are featured in the point cloud and are in sufficiently close proximity to merit higher resolution. For the objects observed at closer ranges, the viewer client may request, from the neural network server, neural network models. The neural network models may be adjusted for the user viewpoint.

For some embodiments, the client sends a neural network request to the neural network server that indicates the object category with which an object most closely matches. Using the requested object category, the neural network server may send a neural network to the viewing client for increasing the level of detail. The level of details for the selected object may be increased by feeding the received neural network with the segment of the point cloud that is labeled as part of the object. The neural network may create a new geometry for the object at a higher resolution by hallucinating typical details that had been observed in, e.g., similar objects at the higher point cloud resolution (from the training data sets). Details that are hallucinated for point clouds may be typical geometric patterns that are added to the overall shape of the object. Details may be created based on the features that are extracted by lower layers of the neural network from the objects that had been fed into the network during the training. The capability of certain neural networks to produce hallucinated details is understood.

If hallucinating a geometry, the output may be new points to replace the input point cloud segment. The new points may feature an altered geometry with an increased level of detail. If the neural network is used to produce a high resolution point cloud data for the selected object, the viewing client may replace the original data points with the corresponding high resolution points produced by the neural network. Point cloud data may be rendered using the high resolution points.

For some embodiments, an example process may include capturing, at a viewing client, data indicative of user movement (or user navigation data for some embodiments); and setting the viewpoint using, at least in part, the data indicative of user movement (or user navigation data for some embodiments). For some embodiments, the process may include capturing motion data of a head mounted display (HMD); and setting the viewpoint using, at least in part, the motion data. For some embodiments of the process, retrieving the neural network model for the selected object may include, responsive to determining the viewing client lacks the neural network model, retrieving, from a neural network server, the neural network model for the selected object.

In some embodiments, the level of detail of point cloud data may be adjusted dynamically in both directions, to go below the full resolution of the point cloud data, while also being able to increase the level of detail above details and sampling density that was present in the original raw point cloud. In some embodiments, a point cloud server, examples of which are described above, enables adjusting point cloud level of detail to go below the resolution of the original raw point cloud data, whereas the neural network server enables level of detail adjustment above the original raw point cloud resolution. This methodology permits wide variation in the range at which the data may be inspected, allowing more freedom for the viewer to navigate through content, while providing a consistent viewing experience.

For some embodiments, reduced data may be transmitted from the point cloud server to the viewing client if the point distances from the viewpoint permit such a reduction. Hence, bandwidth demands may be controlled for large environments captured as point clouds and the level of detail of data may be tailored for rendering and viewing by the viewer.

In some embodiments, rather than the viewing client searching for a suitable neural network server, the point cloud server may instead identify a (e.g., suitable) neural network server as part of the data preprocessing, e.g., based on the object detection that the point cloud server does on the received point cloud. For some embodiments, the point cloud server streams the point cloud to the viewing client and also sends neural networks (or an identification of the server) that the client may use to increase the level of detail. Neural networks, as well as the point cloud data, may be streamed according to the viewpoint the client has specified, relative to the point cloud. In some embodiments, the point cloud server may use neural networks to increase the level of detail of the point cloud data and stream the enhanced point cloud data.

In some embodiments, the point cloud server may use raw point cloud data to train neural networks for hallucinating additional details by producing low resolution versions of the selected object segments from the full resolution point cloud. Such an example methodology may be performed, for example, in situations in which point cloud data has drastically varying sampling density. Such a process may ease general resolution demands, while leaving high resolution portions to be reproduced by the viewing client using the neural networks. For some embodiments, a process may include identifying, at a point cloud server, a neural network server; and transmitting, to a client device, an identification of the neural network server, wherein retrieving the neural network model may include retrieving the neural network model from the neural network server.

Figure 9:
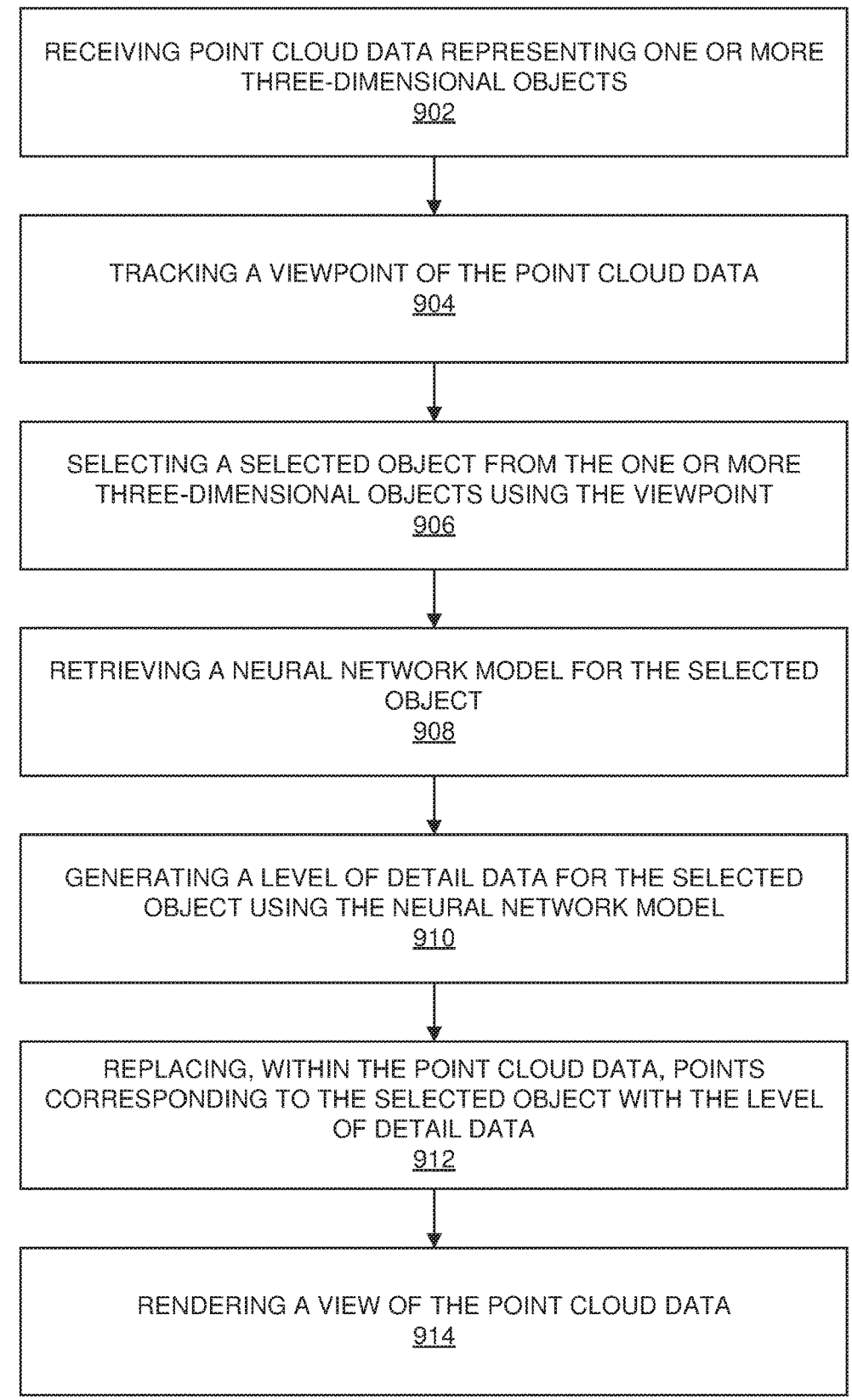
FIG. 9 is a flowchart illustrating an example process, according to some embodiments.

FIG. 9 is a flowchart illustrating an example process, according to some embodiments. For some embodiments, a process 900 may be performed that includes receiving 902 point cloud data representing one or more three-dimensional objects. The process 900 may further include tracking 904 a viewpoint of the point cloud data. The process 900 may also include selecting 906 a selected object from the one or more three-dimensional objects using the viewpoint. The process 900 may include retrieving 908 a neural network model for the selected object. The process 900 may also include generating 910 a level of detail data for the selected object using the neural network model and replacing 912, within the point cloud data, points corresponding to the selected object with the level of detail data. The process 900 also may include rendering 914 a view of the point cloud data. For some embodiments, generating a level of detail data for the selected object may generate an increased level of detail data for the selected object.

While the methods and systems in accordance with some embodiments are discussed in the context of virtual reality (VR), some embodiments may be applied to mixed reality (MR)/augmented reality (AR) contexts as well. Also, although the term "head mounted display (HMD)" is used herein, some embodiments may be applied to a wearable device (which may or may not be attached to the head) capable of, e.g., VR, AR, and/or MR for some embodiments.

An example method in accordance with some embodiments may include: receiving point cloud data representing one or more three-dimensional objects; tracking a viewpoint of the point cloud data; selecting a selected object from the one or more three-dimensional objects using the viewpoint; retrieving a neural network model for the selected object; generating a level of detail data for the selected object using the neural network model; replacing, within the point cloud data, points corresponding to the selected object with the level of detail data; and rendering a view of the point cloud data.

In some embodiments of the example method, generating the level of detail data for the selected object may include hallucinating or inferring additional details for the selected object.

In some embodiments of the example method, hallucinating or inferring additional details for the selected object may increase sampling density of the point cloud data.

In some embodiments of the example method, generating the level of detail data for the selected object may include using a neural network to infer details lost due to a limited sampling density for the selected object.

In some embodiments of the example method, using a neural network to infer details lost for the selected object may increase sampling density of the point cloud data.

The example method in accordance with some embodiments may further include: selecting a training data set for the selected object; and generating the neural network model using the training data set.

In some embodiments of the example method, the level of detail data for the selected object may have a lower resolution than the points replaced within the point cloud data.

In some embodiments of the example method, the level of detail data for the selected object may have a greater resolution than the points replaced within the point cloud data.

In some embodiments of the example method, selecting the selected object from the one or more three-dimensional objects using the viewpoint may include responsive to determining a point distance between an object picked from the one or more three-dimensional objects and the viewpoint is less than a threshold, selecting the object as the selected object.

The example method in accordance with some embodiments may further include: detecting, at a viewing client, one or more objects within the point cloud data, wherein selecting the selected object may include selecting the selected object from the one or more objects detected within the point cloud data.

The example method in accordance with some embodiments may further include: capturing, at a viewing client, data indicative of user movement; and setting the viewpoint using, at least in part, the data indicative of user movement.

The example method in accordance with some embodiments may further include: capturing motion data of a head mounted display (HMD); and setting the viewpoint using, at least in part, the motion data.

In some embodiments of the example method, retrieving the neural network model for the selected object may include responsive to determining a viewing client lacks the neural network model, retrieving, from a neural network server, the neural network model for the selected object.

In some embodiments of the example method, retrieving the neural network model may include retrieving an updated neural network model for the selected object.

The example method in accordance with some embodiments may further include: identifying, at a first server, a second server; and transmitting, to a client device, an identification of the second server, wherein retrieving the neural network model may include retrieving the neural network model from the second server. In some embodiments, the first server may be a point cloud server, and the second server may be a neural network server.

In some embodiments of the example method, retrieving the neural network model may include: requesting, at a point cloud server, the neural network model; receiving, at the point cloud server, the neural network model; and transmitting, to a client device, the neural network model.

In some embodiments of the example method, receiving point cloud data may include receiving point cloud data from a sensor.

An example system in accordance with some embodiments may include: one or more processors; and one or more non-transitory computer-readable mediums storing instructions that are operative, when executed by the processor, to perform any of the methods mentioned above.

The example system in accordance with some embodiments may further include one or more graphics processors.

The example system in accordance with some embodiments may further include one or more sensors.

Another example method in accordance with some embodiments may include: receiving point cloud data representing one or more three-dimensional objects; tracking a viewpoint of the point cloud data; selecting a selected object from the one or more three-dimensional objects using the viewpoint; retrieving a neural network model for the selected object; generating an increased level of detail data for the selected object using the neural network model; replacing, within the point cloud data, points corresponding to the selected object with the increased level of detail data; and rendering a view of the point cloud data.

Another example system in accordance with some embodiments may include: one or more processors; and one or more non-transitory computer-readable mediums storing instructions that are operative, when executed by the processor, to perform any of the methods mentioned above.

Another example method in accordance with some embodiments may include: receiving point cloud data representing one or more three-dimensional objects; receiving a viewpoint of the point cloud data; selecting a selected object from the one or more three-dimensional objects using the viewpoint; retrieving a neural network model for the selected object; generating a level of detail data for the selected object using the neural network model; and replacing, within the point cloud data, points corresponding to the selected object with the level of detail data.

Another example system in accordance with some embodiments may include: one or more processors; and one or more non-transitory computer-readable mediums storing instructions that are operative, when executed by the processor, to perform any of the methods mentioned above.

An example method of providing a three dimensional (3D) rendering of point cloud data in accordance with some embodiments may include: setting a viewpoint for point cloud data; requesting the point cloud data; responsive to receiving the point cloud data, selecting an object within the point cloud data for which a level of detail is to be increased; requesting a neural network model for the object; responsive to receiving the neural network model for the object, increasing the level of detail for the object; replacing points within the received point cloud data, corresponding to the object, with the increased detail data from the neural network model; and rendering a 3D view of the point cloud data.

In some embodiments of the example method, increasing the level of detail for the object may include hallucinating additional details for the object.

Some embodiments of the example method may further include, at a viewing client, detecting objects within the received point cloud data.

Some embodiments of the example method may further include, at a viewing client, capturing user navigation; and setting the viewpoint, at least partially, based on the captured user navigation.

Some embodiments of the example method may further include: capturing motion of a head mounted display (HMD); and setting the viewpoint, at least partially, based on the captured motion.

Some embodiments of the example method may further include, at a viewing client, determining that a new model is needed for the object, wherein requesting a neural network model for the object includes responsive to determining that a new model is needed for the object, requesting a neural network model for the object.

An example system in accordance with some embodiments may include: a processor; and a non-transitory computer-readable medium storing instructions that are operative, when executed by the processor, to perform one of the example methods described above.

Some embodiments of the example system may further include a graphics processor.

An example method of providing a three dimensional (3D) rendering of point cloud data in accordance with some embodiments may include: receiving point cloud data; segmenting the point cloud data; detecting an object within the point cloud data; assigning level of detail labels for points within the point cloud; responsive to receiving a request from a client to provide the point cloud data; identifying a viewpoint associated with the received request; selecting a region of the point cloud to reduce resolution, based on the viewpoint; reducing the resolution for the selected region; and streaming the point cloud data with the reduced resolution and an identification of the detected object to the client.

In some embodiments of the example method, receiving point cloud data includes receiving point cloud data from a sensor.

Some embodiments of the example method may further include, at a point cloud server, identifying a neural network server; and transmitting an identification of the neural network server to the client.

Some embodiments of the example method may further include, at a point cloud server, retrieving a neural network model; and transmitting the neural network model to the client.

An example system in accordance with some embodiments may include: a processor; and a non-transitory computer-readable medium storing instructions that are operative, when executed by the processor, to perform one of the methods described above.

An example method in accordance with some embodiments may include presenting, to a client, a low resolution view of an object.

The example method in accordance with some embodiments may further include requesting, by a client, point cloud data from a server identifying a selected viewpoint relative to the point cloud.

The example method in accordance with some embodiments may further include selecting, based on viewpoints to the point cloud data, objects for which details or resolution may be increased.

The example method in accordance with some embodiments may further include enabling hallucination of an added level of details for the selected objects.

The example method in accordance with some embodiments may further include feeding, to the received neural network, point cloud segments labeled as part of the selected object to produce a higher resolution version of the selected object.

The example method in accordance with some embodiments may further include replacing object segments in the point cloud streamed from the point cloud server with the higher resolution version of the selected object.

The example method in accordance with some embodiments may further include presenting, to a user, point cloud data with a dynamically-adjusted level of detail.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:
receiving, at a client device, (i) data representing a point cloud comprising objects, and (ii) an identifier specifying a server from which neural network models may be retrieved;
selecting an object within the point cloud;
retrieving, from the server, a neural network model corresponding to the selected object;
generating an increased level of detail for the selected object using the retrieved neural network model; and
rendering a view of the point cloud using the increased level of detail.

2. The method of claim 1, further comprising:
receiving segmentation information, the segmentation information indicating portions of the point cloud which correspond to the objects,
wherein selection of the object within the point cloud is based on the received segmentation information.

3. The method of claim 1, further comprising:
tracking a viewpoint of a user relative to the point cloud,
wherein selection of the object within the point cloud is based on the tracked viewpoint.

4. The method of claim 1, further comprising:
analyzing the data representing the point cloud to determine a set of objects present in the point cloud,
wherein selection of the object within the point cloud is based on the set of determined objects.

5. The method of claim 1, further comprising:
generating the point cloud from the data representing the point cloud, the generated point
cloud having an original level of detail which is less detailed than the increased level of detail; and
displaying the generated point cloud to a user.

6. An apparatus comprising:
a processor; and
a non-transitory computer-readable medium storing instructions operative, when executed by the processor, to cause the apparatus to:
receive, at a client device, (i) data representing a point cloud comprising objects, and (ii) an identifier specifying a server from which neural network models may be retrieved;
select an object within the point cloud;
retrieve, from the server, a neural network model corresponding to the selected object;
generate an increased level of detail for the selected object using the retrieved neural network model; and
render a view of the point cloud using the increased level of detail.

7. The apparatus of claim 6, wherein the instructions are further operative, when executed by the processor, to cause the apparatus to:
receive segmentation information, the segmentation information indicating portions of the point cloud which correspond to the objects,
wherein selection of the object within the point cloud is based on the received segmentation information.

8. The apparatus of claim 6, wherein the instructions are further operative, when executed by the processor, to cause the apparatus to:
track a viewpoint of a user relative to the point cloud,
wherein selection of the object within the point cloud is based on the tracked viewpoint.

9. The apparatus of claim 6, wherein the instructions are further operative, when executed by the processor, to cause the apparatus to:
analyze the data representing the point cloud to determine a set of objects present in the point cloud,
wherein selection of the object within the point cloud is based on the set of determined objects.

10. The apparatus of claim 6, wherein the instructions are further operative, when executed by the processor, to cause the apparatus to:
generate the point cloud from the data representing the point cloud, the generated point cloud having an original level of detail which is less detailed than the increased level of detail; and
display the generated point cloud to a user.

11. A method comprising:
receiving, at a client device, (i) data representing a point cloud, (ii) segmentation information identifying segmented portions of the point cloud, and (iii) an identifier specifying a server from which neural network models may be retrieved;
selecting a portion of the point cloud based on the segmentation information;
retrieving, from the server, a neural network model corresponding to the selected portion;
generating an increased level of detail for the selected portion using the retrieved neural network model; and
rendering a view of the point cloud using the increased level of detail.

12. The method of claim 11, further comprising:
tracking a viewpoint of a user relative to the point cloud,
wherein selection of the portion of the point cloud is based on the tracked viewpoint.

13. The method of claim 11, further comprising:
generating the point cloud from the data representing the point cloud, the generated point cloud having an original level of detail which is less detailed than the increased level of detail; and
displaying the generated point cloud to a user.

14. An apparatus comprising:
a processor; and
a non-transitory computer-readable medium storing instructions operative, when executed by the processor, to cause the apparatus to:
receive, at a client device, (i) data representing a point cloud, (ii) segmentation information identifying segmented portions of the point cloud, and (iii) an identifier specifying a server from which neural network models may be retrieved;
select a portion of the point cloud based on the segmentation information;
retrieve, from the server, a neural network model corresponding to the selected portion;
generate an increased level of detail for the selected portion using the retrieved neural network model; and
render a view of the point cloud using the increased level of detail.

15. The apparatus of claim 14, wherein the instructions are further operative, when executed by the processor, to cause the apparatus to:
track a viewpoint of a user relative to the point cloud,
wherein selection of the portion of the point cloud is based on the tracked viewpoint.

16. The apparatus of claim 14, wherein the instructions are further operative, when executed by the processor, to cause the apparatus to:
generate the point cloud from the data representing the point cloud, the generated point cloud having an original level of detail which is less detailed than the increased level of detail; and
display the generated point cloud to a user.

* * * * *